(12) United States Patent
Krieger (10) Patent No.: US 9,457,633 B2
(45) Date of Patent: Oct. 4, 2016

(54) CROSS MEMBER SYSTEM FOR A COUPLING DEVICE A MOTOR VEHICLE

(71) Applicant: Benteler Automobiltechnik GmbH, Paderborn (DE)

(72) Inventor: Ryan Krieger, Portage, MI (US)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 15 days.

(21) Appl. No.: 14/519,881

(22) Filed: Oct. 21, 2014

(65) Prior Publication Data

US 2016/0107493 A1   Apr. 21, 2016

(51) Int. Cl.
*B60D 1/00* (2006.01)
*B60D 1/48* (2006.01)

(52) U.S. Cl.
CPC .............. *B60D 1/485* (2013.01); *B60D 1/48* (2013.01)

(58) Field of Classification Search
CPC .......... B60D 1/485; B60D 1/00; B60D 1/48
USPC ..................... 280/495; 72/51, 367.1, 368
See application file for complete search history.

(56) References Cited

U.S. PATENT DOCUMENTS

| | | | |
|---|---|---|---|
| 4,018,634 A * | 4/1977 | Fencl | C21D 8/10 148/520 |
| 4,032,170 A * | 6/1977 | Wood | B60D 1/06 280/495 |
| 4,148,426 A * | 4/1979 | Midzutani | B21D 5/015 228/146 |
| 5,102,156 A * | 4/1992 | Fink | B60D 1/485 280/495 |
| 5,149,122 A * | 9/1992 | Helber | B62D 53/0828 280/491.1 |
| 5,193,837 A * | 3/1993 | Fink | B60D 1/48 280/495 |
| 5,489,111 A * | 2/1996 | Collins | B60D 1/52 280/491.5 |
| 5,507,515 A * | 4/1996 | Schellenberg | B60D 1/38 280/491.5 |
| 5,511,813 A * | 4/1996 | Kravitz | B60D 1/42 280/495 |
| 5,620,198 A * | 4/1997 | Borchers | B60D 1/52 280/491.5 |
| 6,173,984 B1 * | 1/2001 | Kay | B60D 1/145 280/491.5 |
| 6,357,780 B1 * | 3/2002 | Young | B60D 1/241 224/448 |
| 6,464,240 B1 * | 10/2002 | Seksaria | B60D 1/485 280/495 |

(Continued)

FOREIGN PATENT DOCUMENTS

DE   101 07 080 A1   8/2002
EP   1 008 468 A2   6/2000

*Primary Examiner* — Kevin Hurley
*Assistant Examiner* — Michael Stabley
(74) *Attorney, Agent, or Firm* — Henry M. Feiereisen LLC (57) ABSTRACT

A cross member system for a coupling device of a motor vehicle includes a tubular cross member, which extends between two lateral fastening consoles and a coupling mounting, which is connected with the cross member in a central section of the cross member. The cross member has a varying cross sectional course in longitudinal direction and is formed from a cut-to size-plate by a U/O-forming and is longitudinal seam welded. A central section of the cross member has a polygonal cross section. The cross member further has lateral end sections with a cross section which deviates from the polygonal cross section.

15 Claims, 5 Drawing Sheets

(56) References Cited

U.S. PATENT DOCUMENTS

| | | | | |
|---|---|---|---|---|
| 6,578,864 B2 * | 6/2003 | McCoy | B60D 1/52 | 280/491.5 |
| 6,669,223 B2 * | 12/2003 | Sekaria | B60D 1/485 | 280/495 |
| 6,729,638 B2 * | 5/2004 | McCoy | B60D 1/485 | 280/495 |
| 6,846,001 B2 * | 1/2005 | Seksaria | B60D 1/485 | 280/491.5 |
| 7,100,936 B1 * | 9/2006 | Cheng | B60D 1/485 | 280/491.5 |
| 7,156,411 B2 * | 1/2007 | Jaekel | B60D 1/54 | 280/479.1 |
| 7,690,672 B2 * | 4/2010 | Scruggs | B60D 1/06 | 280/491.2 |
| 7,971,895 B2 * | 7/2011 | Kozuka | B60D 1/06 | 280/491.5 |
| 8,091,913 B1 * | 1/2012 | White | B60D 1/06 | 280/456.1 |
| 8,276,428 B2 * | 10/2012 | Bruggenbrock | B21D 5/015 | 72/389.1 |
| 8,459,076 B2 * | 6/2013 | Flehmig | B21C 37/08 | 72/380 |
| 8,720,932 B2 * | 5/2014 | Kim | B60D 1/06 | 280/491.1 |
| 2004/0021295 A1 * | 2/2004 | Westerdale | B60D 1/52 | 280/495 |
| 2011/0162431 A1 * | 7/2011 | Flehmig | B21C 37/065 | 72/368 |
| 2012/0073348 A1 * | 3/2012 | Prehn | B21C 37/0815 | 72/338 |

* cited by examiner

Fig. 10

CROSS MEMBER SYSTEM FOR A COUPLING DEVICE A MOTOR VEHICLE

BACKGROUND OF THE INVENTION

The invention relates to a cross member system for a coupling device of a motor vehicle including a tubular cross member which extends between two lateral fastening consoles, and a coupling mounting connected to the cross member in a central section of the cross member.

U.S. Pat. No. 4,032,170 A discloses an assembly of parts and a method for welding these parts together in order to provide a trailer coupling for motor vehicles. The components of the coupling can be welded together in different configurations so as to be adjustable to different vehicle types such as passenger car, station wagons, Pickup trucks or small buses. The focus in this context is on the North American market. One feature is the trailer coupling or the coupling hook which can be welded in a central tubular coupling mounting. A further feature are the two lateral fastening consoles. These are formed by two tubular legs which are welded at an angle to each other. One of the legs is arranged in the cross member so as to be longitudinally shiftable and fixable in the cross member. The other leg, which is oriented in longitudinal direction of the vehicle, is associated to a longitudinal member of the vehicle frame and movable relative to the longitudinal member and is fixable to the longitudinal member.

EP 1 008 468 B2 discloses a coupling carrier for motor vehicles including a cross member on which a trailer coupling can be mounted. Two holders, which are spaced apart in longitudinal direction of the cross member, carry the cross member. The holders can be connected to mounting sites provided on a body of the motor vehicle. The cross member is connected with the holders by means of connecting elements in the form of intermediate parts extending between the cross member and the holders.

DE 101 07 080 A1 describes a trailer coupling for a motor vehicle with a cross member which can be fastened to vehicle support members via mountings. On the cross member a coupling device is fastened.

Figure 1:
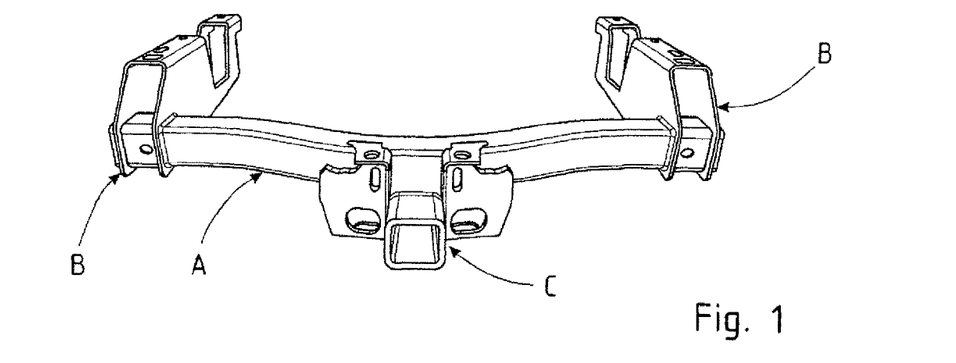
FIG. 1 a conventional cross member system according to the state of the art.

The conventional construction of a cross member system common in the state of the art includes a tubular cross member extending between two lateral fastening consoles and a coupling mounting which is connected with the cross member in a central section of the cross member. This construction is shown in FIG. 1.

The cross member is formed by a welded tube or a seamlessly extruded tube and has either a rectangular or square or circular cross section continuous along its entire length. Usually the cross member has a wall thickness of 5 mm to 7 mm and is made of a steel with a tensile strength of 300 MPa to 400 MPa. With a weight of 25 kg to 30 kg the cross member is relatively heavy and correspondingly also the entire cross member system.

SUMMARY OF THE INVENTION

The invention is based on the object to provide a cross member system for a motor vehicle with improved manufacturability and in particular to provide a weight-reduced cross member system with a stress-optimized design.

This object is solved according to the invention with a cross member system A cross member system for a coupling device of a motor vehicle, including two lateral fastening consoles; a tubular cross member extending between the two lateral fastening consoles; and a coupling mounting connected with the cross member in a central section of the cross member, wherein the cross member is formed from a cut-to-size plate into a hollow section by a U/O-forming and contacting edges of the formed plate are welded to each other.

Advantageous embodiments and refinements of the general inventive idea are the subject matter of the dependent claims.

The cross member system for a coupling device of a motor vehicle includes a tubular cross member which extends between two lateral fastening consoles. Further a coupling mounting is provided for receiving a trailer coupling or coupling hook. The coupling mounting is connected to the cross member in a central section of the cross member.

According to the invention, the cross member is formed into a hollow section from a cut-to-size plate by a U/O forming. As starting product for a cross member a cut-to-size steel plate is produced with a geometry essentially corresponding to the planar uncoiled finished cross member. The geometry of the cut-to size plate corresponds to the planar uncoiled finished cross member taking into account the geometrical changes on the cross member caused by the forming process. Subsequently this cut-to-size plate is first formed into a U-shape in a forming tool. For this the plate is inserted into a bottom die of the forming tool and impinged by a male die and formed to adopt the U-shape of the bottom die. Hereby the plate is thus first formed into an intermediate section which is open to one side, i.e., a U-shaped intermediate section. In the next step the O-forming is performed, wherein the U-shaped intermediate section is formed into a closed hollow section. Hereby a top die is used which has a configuration with a counter shape which is correspondingly adapted to the cross sectional course of the cross member. Subsequent thereto the contacting edges of the plate, which is formed into a slot or hollow section, are welded, in particular longitudinal seam welded.

A particularly advantageous embodiment of the cross member according to the invention is that the cross member has a varying cross section in longitudinal direction.

The cross sectional configuration of the cross member is configured stress-optimized in its longitudinal direction. In the central section the stress on the cross member is particularly high because the coupling mounting is located at this location. Here high forces and moments act on the cross member. The cross section of the cross member is correspondingly geometrically configured in the central section so that the section modulus is adapted to the here occurring stress. For this reason the cross member has a polygonal cross section in the central section. In particular the cross member has a rectangular cross section, preferably a square cross section in the central section. A polygonal, in particular rectangular or square, cross section is capable to absorb more stress at same cross sectional size compared to a round, for example circular, cross section. In addition the cross member has a greater surface area in the central section, i.e., in the region with a polygonal cross section. This means that the cross section is greater in the central section than in the end sections.

In contrast to a polygonal cross section, the stress in case of a round cross section is distributed evenly to the entire circumference. According to the invention the cross section in the end sections of the cross member for this reason deviates from the polygonal cross section, and is in particular a round cross section, preferably a circular cross section. This is advantageous for the force introduction into the fastening consoles and decreases the stress tensions in the transition from the cross member to the fastening consoles.

Between the central section and the end sections a respective transition section is provided. Via the transition section the central section transitions respectively into an end section.

Due to the stress-optimized geometry of the cross member and its cross sectional configuration, the wall thickness of the cross member can be reduced compared to conventional constructions. According to one aspect of the invention the cross member has a wall thickness between 3.0 mm and 4.0 mm. This allows to significantly save weight and material.

The cross member preferably consists of a steel material, i.e., a steel material with a tensile strength of 300 MPa to 900 MPa, wherein in particular a steel material is used having a tensile strength $R_m$ of 780 MPa to 800 MPa.

According to a further aspect of the invention the cross member can have a wall thickness which varies along its extent. The cross member can have sections with different wall thicknesses distributed along its circumference in longitudinal direction as well as in transverse direction.

The cross member can also have a three dimensionally curved course along its length. This measure also contributes to providing the cross member system with a configuration that is adjusted to the encountered stress and adjusting the section modulus of the cross member. It is advantageous in this regard when the ends are round, in particular circular. The cross member can thus be rotated in the mountings of the fastening consoles during mounting in order to correctly position the cross member and to join it with the fastening consoles.

The coupling mounting has a tubular body which is oriented transversely to the central section. In the tubular body of the coupling mounting a trailer coupling or the coupling hook can be fastened. For this purpose the coupling mounting is provided with corresponding fastening components.

Preferably the coupling mounting is arranged below the central section and joined with the central section, in particular welded to the central section.

A respective end section of the cross member is connected with a fastening console. Hereby the end section is held in a mounting of the fastening console. This mounting can be realized by a through-passage in a leg of the fastening console. A through-passage has an opening with a collar that has a flared rim, in particular a circumferential collar.

A particularly advantageous embodiment provides that a fastening console is configured U-shaped and has a web with two lateral legs. In each leg an opening is provided, wherein the openings in the legs correspond to each other and form a mounting for a respective end section of the cross member. Also in this case each opening is preferably formed by a through-passage with a circumferential collar along its rim. Preferably the collars of the two through-passages are flared in opposite directions. The collars increase the support surface for the mounting of the end sections of the cross member. The flare of the collars in the two through-passages of a fastening console in opposite directions also increases the support width of the mounting.

BRIEF DESCRIPTION OF THE DRAWING

In the following the invention is described by way of drawings. It is shown in.

DETAILED DESCRIPTION OF PREFERRED EMBODIMENTS

FIG. 1 shows a cross member system known from the state of the art. The cross member system has a tubular cross member A. The cross member A extends between two lateral fastening consoles B, to which it is welded. In the central region below the cross member A a coupling mounting C is welded to the cross member A. The coupling mounting C serves for affixing a coupling hook.

Figure 2:
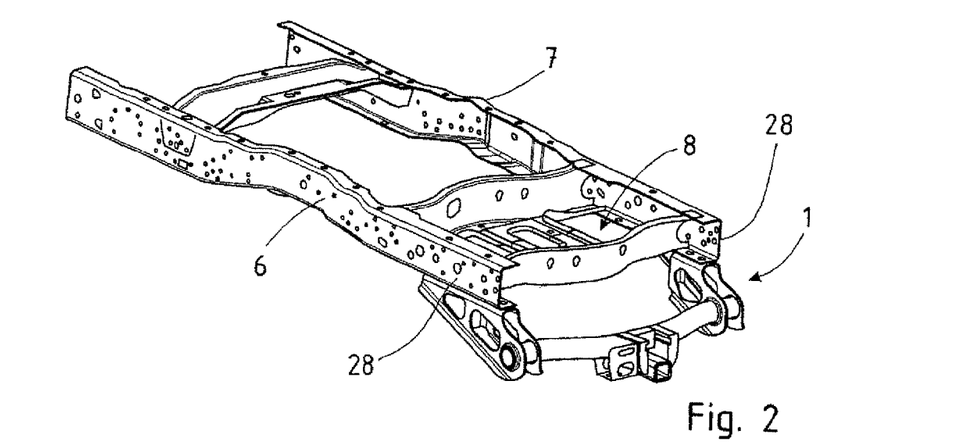
FIG. 2 the section of the rear region of a carrier frame of a motor vehicle with a cross member system according to the invention.
Figure 3:
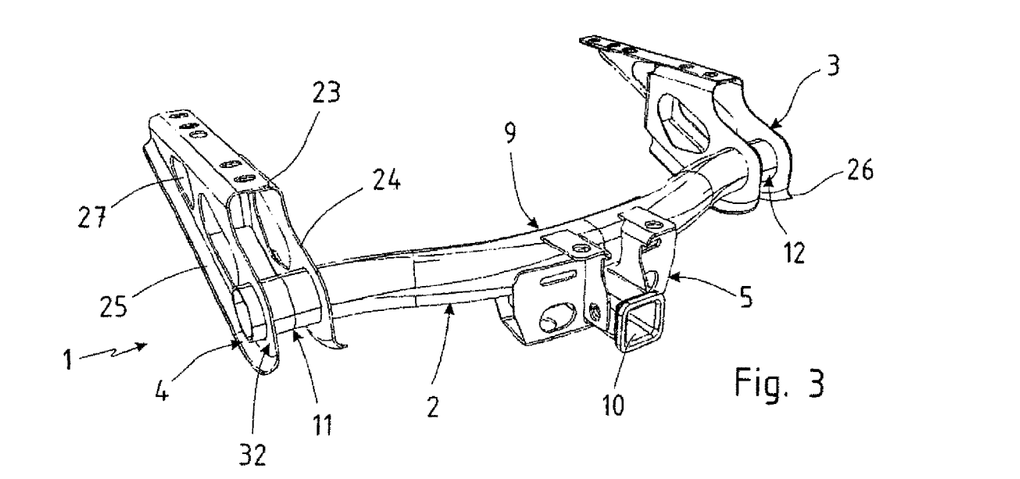
FIG. 3 an enlarged representation of the cross member system corresponding to FIG. 2.

A cross member system according to the invention is shown in FIGS. 2 and 3. FIG. 2 shows a support structure of a motor vehicle with two longitudinal members 6, 7 and a subframe 8 integrated on the rear side between the two longitudinal members 6, 7. FIG. 3 shows an enlarged representation of the cross member system 2 according to FIG. 2.

The cross member system 1 for a coupling device of a motor vehicle includes a tubular cross member 2 which extends between two lateral fastening consoles 3, 4. In a central section 9 of the cross member 2 a coupling mounting 5 is connected with the cross member 2. The coupling mounting 5 has a tubular body 10, which is oriented transversely to the central section 9, and below the cross member 2 is welded in the central section 9 with the central section. A coupling hook can be fixed in the tubular body 10.

Figure 4:
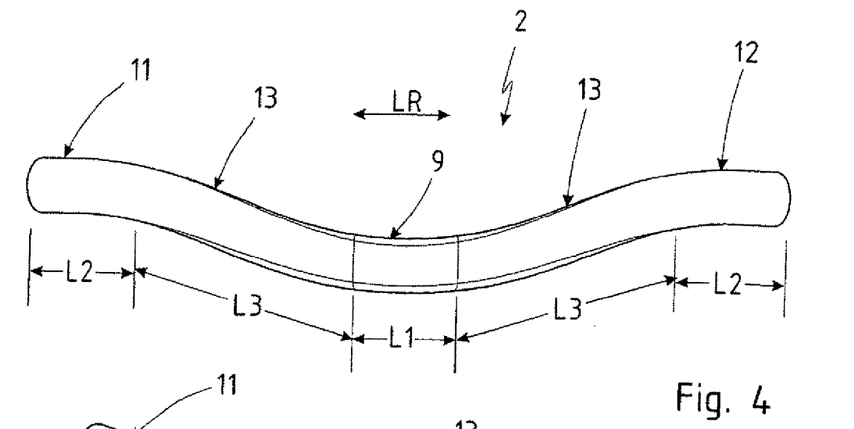
FIG. 4 the cross member of a cross member system according to the invention.
Figure 5:
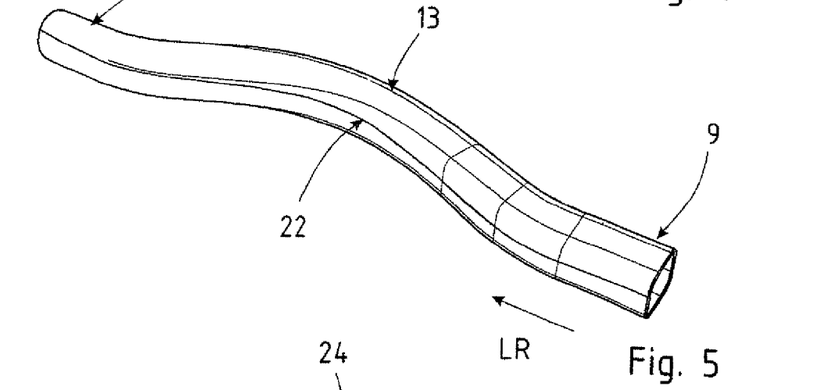
FIG. 5 a section of a cross member.

The cross member 2 has a varying cross sectional course in longitudinal direction LR. The cross member 2 can be recognized in particular in FIGS. 4 and 5. FIG. 4 shows the cross member 2 in its entire length, whereas FIG. 5 shows a half of the cross member 2.

Figure 10:
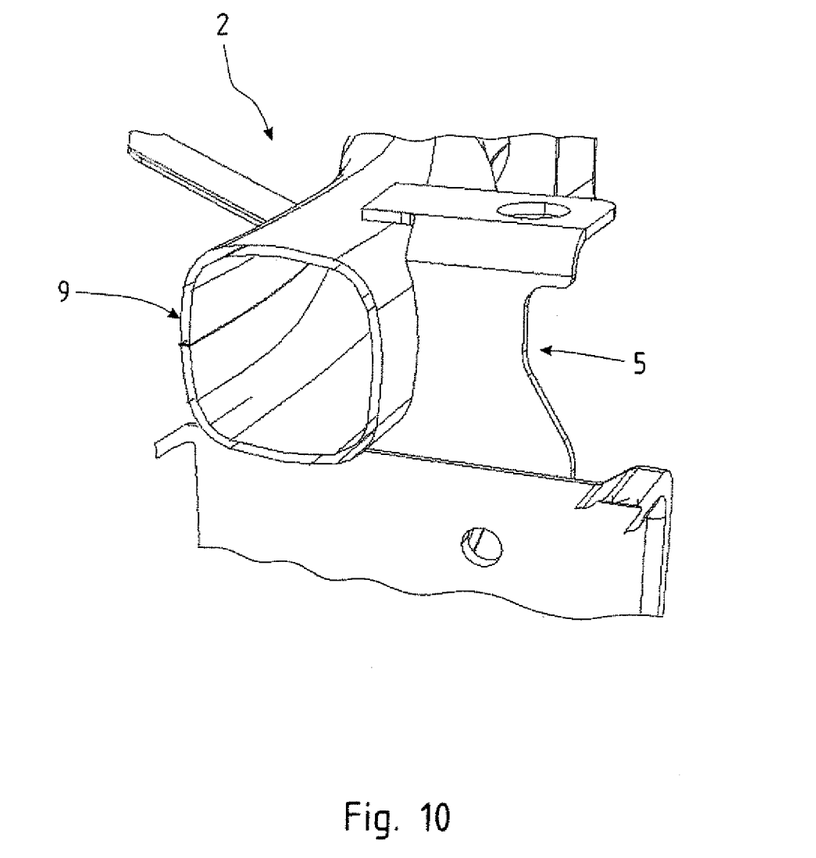

In the central section 9 the cross member 2 has a length L1. In the central section 9 the cross member 2 has a polygonal, i.e., rectangular or square cross section. The square cross section can be seen in the representation of FIG. 10. The cross member 2 has lateral end sections 11, 12. The end sections 11, 12 have a cross section which deviates from the polygonal cross section. In particular, the cross section in the end sections 11, 12 is preferably circular. Between the central section 9 and the end sections 11, 12 a respective transition region 13 is provided. Starting from the central section 9 with the polygonal cross section, the cross sectional course of the transition regions 13 changes up to the round, in particular circular, cross sections on the end sections 11, 12. The cross sectional configuration of the cross member 2 is configured stress-optimized regarding the forces and moments occurring during operation. In particular, as a result of its polygonal shape, the cross section in the central section 9 has a high section modulus. The surface area of the cross section in the central section 9 is greater than the surface area of the cross section in the end sections 11, 12.

FIG. 4 also illustrates the length L1 of the central section 9, the length L2 of the end sections 11, 12 and the length L3 of the transition sections 13 respectively between the central section 9 and an end section 11, 12. The cross section remains constant along the length L1 of the central section 9. Along the length L3 of the transition section 13 the cross section decreases up to the end section 11, 12. In the end section 11, 12 the cross section is constant over the length L2.

Figure 7:
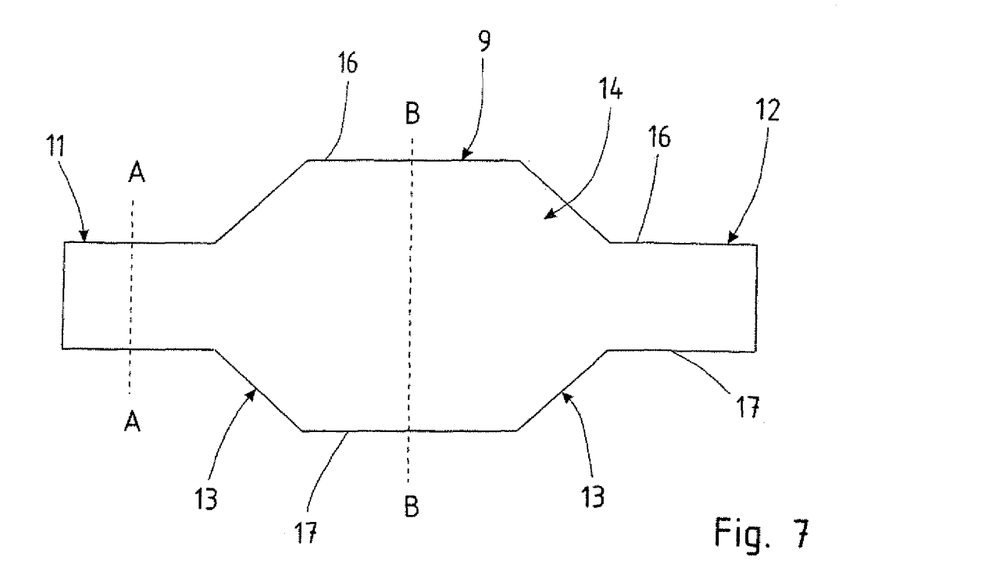
FIG. 7 schematically a planar uncoiled cut-to-size steel plate for producing a cross member.
Figure 9:
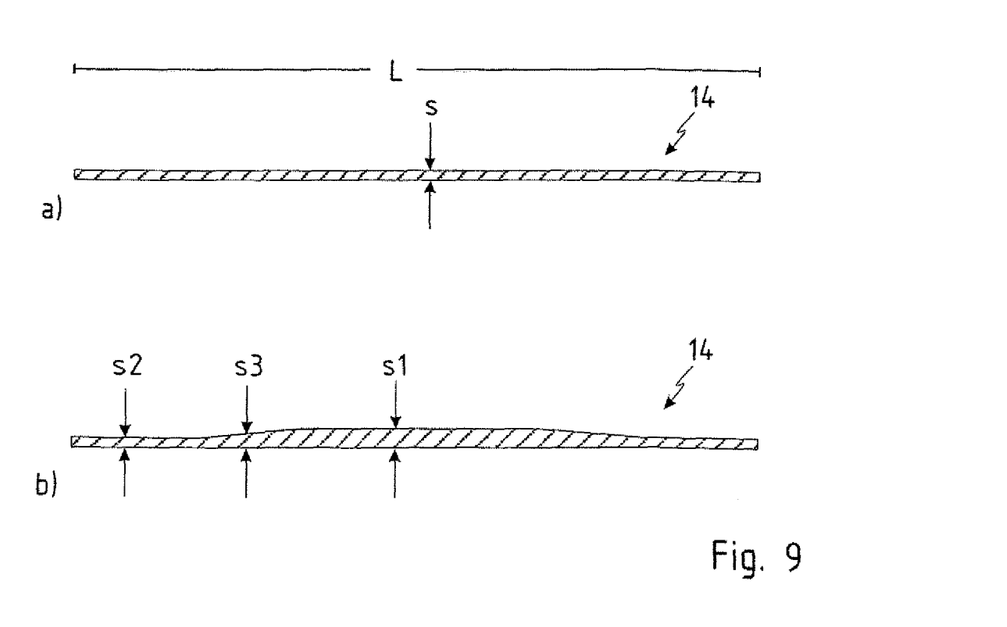
FIG. 9 a longitudinal sectional view of a plate for producing a cross member with constant wall thickness (FIG. 9*a*) and a plate with a varying wall thickness along its extent (FIG. 9*b*) and FIG. 10 a vertical section through the central section of a cross member of a cross member system according to the invention.

The cross member 2 is produced from a cut-to-size steel plate 14 (see FIG. 7). The plate 14 has a wall thickness between 3.0 mm and 4 mm. Correspondingly the wall thickness of the cross member 2 produced from the plate 14 is also between 3.0 mm and 4.0 mm. The steel material also preferably has a tensile strength $R_m$ between 780 MPa to 800 MPa. FIG. 9*a*) shows the plate 14 in a longitudinal section. The plate 14 has a constant wall thickness along its length L.

According to the invention the cross member 2 is produced by a U/O forming. Hereby the plate 14 is formed into a hollow section 15 and the opposing edges 16, 17 of the formed pate 14 are subsequently welded to each other.

Figure 8:
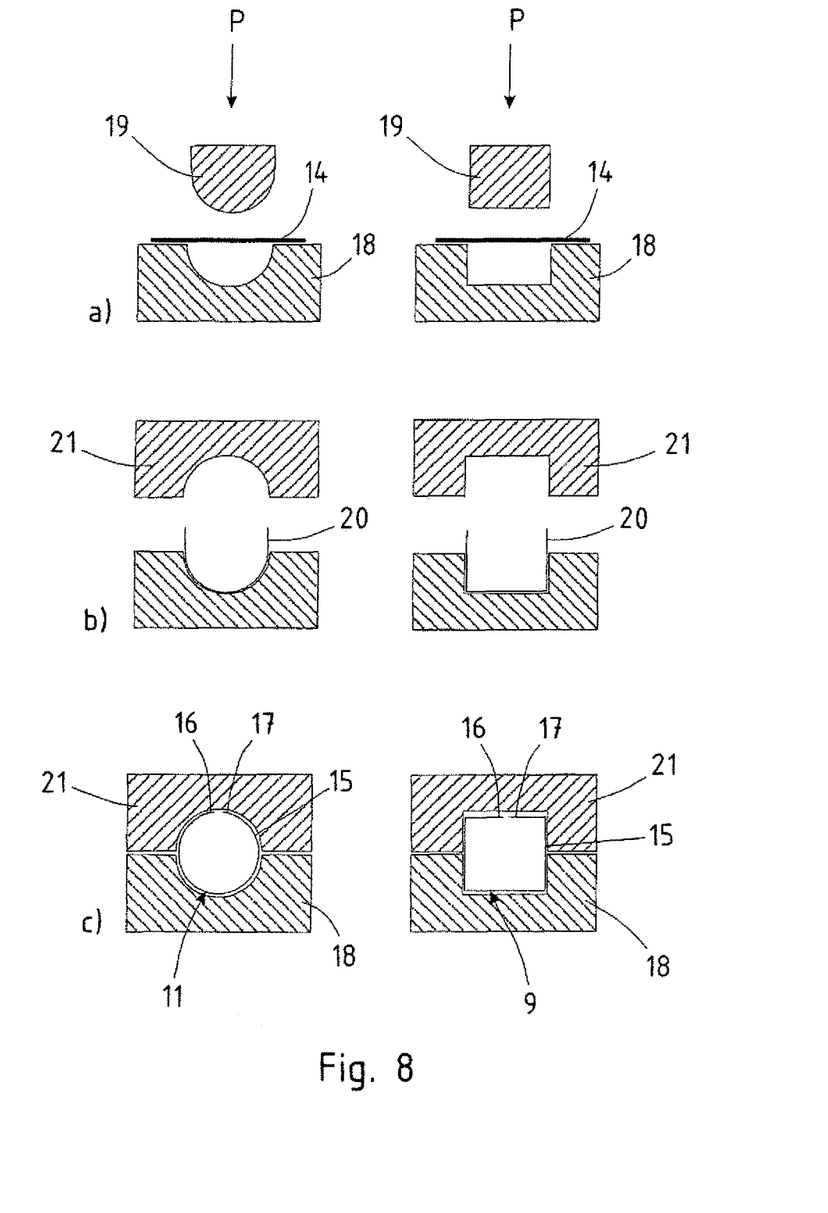
FIG. 8 a technically strongly simplified representation of the U/O forming of a cut-to-size plate for producing a cross member in three forming stages a) to c)

The forming process is explained by way of FIG. 8 in a technically simplified manner. FIG. 8 shows the forming process in three different forming stages a), b) and c), wherein respectively the region of the plate 14 is shown according to the sectional line A-A or B-B of FIG. 7.

The cut-to-size plate 14 substantially has the geometry of the planar uncoiled finished cross member 2 taking the geometric changes resulting from the forming process into account. The plate 14 is inserted in to the bottom die 18. In the regions that form the later end sections 11, 12 the bottom die 18 has a semi-circular U-profile (see FIG. 8*a*) left hand representation). In the region of the later central section 9 the bottom die 18 has a rectangular U-profile. During the forming process the plate 14 is formed by a male die 19 into an upwardly open intermediate profile 20 (FIGS. 8*a*) and 8*b*)). In the region of the end sections 11, 12 the male die 19 has a semi-circular U-shaped contour corresponding to the later contour of the cross member 2, whereas in the region of the later central section 9 the male die 19 has a rectangular contour. The arrows P indicate the direction of movement of the male die 19 during the forming of the plate 14 into the U-shape. The thus preformed intermediate profile 20 is then formed into the hollow section 15 by means of a top die 21. This is illustrated by FIGS. 8*b*) and 8*c*), After the plate 14 is formed into the hollow section 15 the opposing, in particular abutting, edges 15, 16 of the formed plate 14 are welded. The welding seam 22 can be seen in the representation of FIG. 5.

It is also possible that the wall thickness of the plate 14 is reduced in regions by rolling prior to the U/O forming and the plate is subsequently cut. Hereby sections of the plate 14 are provided with different wall thicknesses. The different dimensioning of the wall thickness is adjusted to the stress encountered by the cross member 2 during operation. A plate 14 with a varying course of wall thickness is shown in FIG. 9*b*) in a longitudinal section. The wall thickness s1 is greatest in the central section 9. In the end sections 11, 12 the plate 14 has a wall thickness s2. The wall thickness s3 in the transition section 13 decreases starting from the wall thickness s3 up to the wall thickness s1.

As also shown in FIGS. 2, 3, 4 and 5 the cross member 2 has a three dimensionally curved course along its length L.

The fastening consoles 3, 4 are also configured stress and weight-optimized. The fastening consoles 3, 4 are produced by a punching and bending process in each case from a steel plate.

Figure 6:
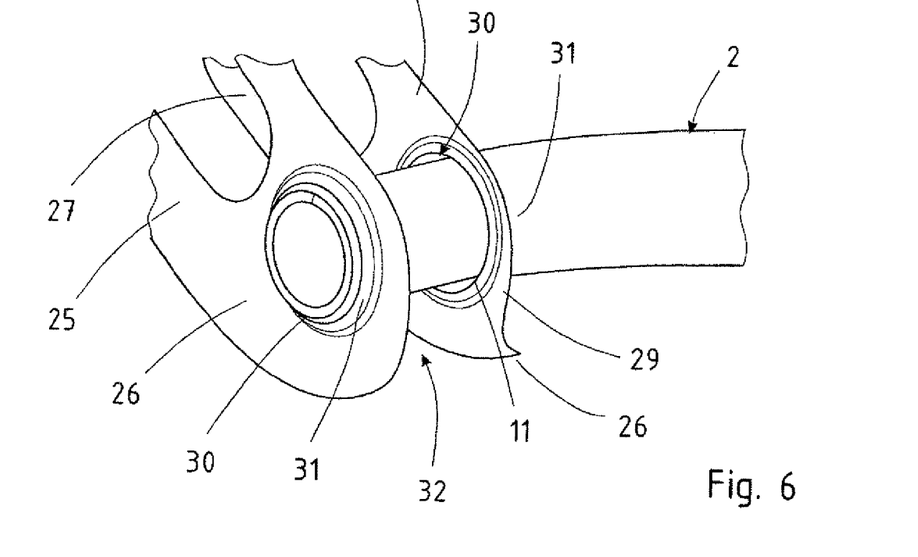
FIG. 6 the section of the connection region between an end section of a cross member and a fastening console.

In particular FIGS. 2 and 3 and in particular FIG. 6 illustrate that each fastening console 3, 4 is configured U-shaped with a web 23 and two lateral legs 24, 25. At the free ends of the legs 24, 25 respective outwardly oriented flange sections 26 are provided. Further punch outs 27 are introduced into the legs 24, 25. These contribute to the weight-optimized design of the cross member system 1. With the web 23 the fastening console 3, 4 is fastened, in particular screwed, to the ends 28 of the longitudinal member 6, 7.

In each leg 24, 25 a opening 29 is provided which is formed by a through-passage 30 with a circumferential collar 31 along its rim. The collars 31 of the two through-passages 30 point in opposite directions. The openings 29 in the legs 24, 25 correspond to each other and form a mounting 32 for an end section 11, 12 of the cross member 2.

FIG. 6 shows the end section 11 of the cross member 2 received in a mounting 32. It can be seen that the end section 11, 12 traverses the openings 26 in the legs 24, 25 and is supported in the through-passages 30. Hereby the end sections 11, 12 traverse the mounting 32 respectively entirely up to the outside of the outer leg 25. In the mountings 32 the end sections 11, 12 of the cross member 2 are respectively welded.

What is claimed is:

1. A cross member system, for a coupling device of a motor vehicle, comprising:
    two lateral fastening consoles each being configured U-shaped and having a web with two lateral legs, each of the two lateral legs being provided with an opening, with the opening of one of the legs being aligned with the opening of the other leg so as to form a mounting for a respective end section of the cross member, wherein the opening is formed by a through-passage having a rim provided with a circumferential collar;
    a tubular cross member extending between the two lateral fastening consoles and being formed from a cut-to-size plate into a hollow section by a U/O-forming and contacting edges of the formed plate are welded to each other; and
    a coupling mounting connected with the cross member in a central section of the cross member.

2. The cross member system of claim 1, wherein a cross section of the cross member varies in a longitudinal direction of the cross member.

3. The cross member system of claim 1, wherein the central section of the cross member has a polygonal cross section, preferably a rectangular cross section, in particular a square cross section, and wherein the cross member has lateral end sections having a cross section deviating from the polygonal cross section, in particular a round cross section, preferably a circular cross section.

4. The cross member system of claim 1, wherein a respective transition section is provided between the central section an the end sections.

5. The cross member system of claim 1, wherein the cross member has a wall thickness between 3.0 mm and 4.0 mm.

6. The cross member system of claim 1, wherein the cross member is made of a steel material having a tensile strength ($R_m$) of 300 MPa to 900 MPa.

7. The cross member system of claim 1, wherein the cross member is made of a steel material having a tensile strength ($R_m$) of 780 MPa to 800 MPa.

8. The cross member system of claim 1, wherein the cross member has wall thicknesses that are adjusted to a stress encountered by the cross member during operation.

9. The cross member system of claim 1, wherein the cross member has a three dimensionally curved course along a length of the cross member.

10. The cross member system of claim 1, wherein the coupling mounting comprises a tubular body, which is oriented transversely to the central section.

11. The cross member system of claim 1, wherein the coupling mounting is arranged below the central section and is joined with the central section.

12. The cross member system of claim 1, wherein end sections of the cross member are respectively connected with a fastening console, and wherein the each of the end sections is held in a mounting of the fastening console.

13. The cross member system of claim 12, wherein the mounting has a through-passage in a leg of the fastening console.

14. The cross member system of claim 1, wherein the collars of the through-passage of one of the legs and the collar of the through passage of the other one of the legs point in opposite directions.

15. A method for producing a cross member system for a coupling device of a motor vehicle, comprising:

producing a tubular cross member by cutting a steel plate to size, forming the cut-to-size steel plate into a hollow section by a U/O-forming, and welding contacting edges of the formed steel plate to each other, wherein a geometry of the cut-to-size steel plate corresponds to a geometry of the cross member in an uncoiled planar state of the cross member;

providing two lateral fastening consoles each being configured U-shaped and having a web with two lateral legs, each of the two lateral legs being provided with an opening, with the opening of one of the legs being aligned with the opening of the other leg so as to form a mounting for a respective end section of the cross member wherein the opening is formed by a through-passage having a rim provided with a circumferential collar;

arranging the tubular cross member between the two lateral fastening consoles; and connecting a coupling mounting with the cross member in a central section of the cross member.

* * * * *